United States Patent
Liu et al.

(10) Patent No.: US 12,477,433 B2
(45) Date of Patent: Nov. 18, 2025

(54) CHANNEL ESTIMATION FOR MULTIPLE RADIO ACCESS TECHNOLOGIES IN A HIGH SPEED SCENARIO

(71) Applicant: QUALCOMM Incorporated, San Diego, CA (US)

(72) Inventors: Zhanyi Liu, Beijing (CN); Ling Xie, Beijing (CN); Chinmay Shankar Vaze, San Diego, CA (US); Xuqiang Zhang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 255 days.

(21) Appl. No.: 18/258,933

(22) PCT Filed: Mar. 5, 2021

(86) PCT No.: PCT/CN2021/079230
§ 371 (c)(1),
(2) Date: Jun. 22, 2023

(87) PCT Pub. No.: WO2022/183466
PCT Pub. Date: Sep. 9, 2022

(65) Prior Publication Data
US 2024/0049095 A1    Feb. 8, 2024

(51) Int. Cl.
*H04W 36/32* (2009.01)
*H04W 36/00* (2009.01)
*H04W 36/24* (2009.01)

(52) U.S. Cl.
CPC ......... *H04W 36/32* (2013.01); *H04W 36/249* (2023.05); *H04W 36/00692* (2023.05); *H04W 36/00698* (2023.05)

(58) Field of Classification Search
CPC combination set(s) only.
See application file for complete search history.

(56) References Cited

U.S. PATENT DOCUMENTS

| | | | |
|---|---|---|---|
| 7,027,815 B2 * | 4/2006 | Sendonaris | H04W 56/0055 455/10 |
| 8,625,724 B2 | 1/2014 | Song et al. | |

(Continued)

FOREIGN PATENT DOCUMENTS

| | | |
|---|---|---|
| CN | 102414987 A | 4/2012 |
| CN | 104994551 A | 10/2015 |

(Continued)

OTHER PUBLICATIONS

Supplementary European Search Report—EP21928549—Search Authority—M—Nov. 5, 2024 (204762EP).

(Continued)

*Primary Examiner* — Charles N Appiah
(74) *Attorney, Agent, or Firm* — Holland & Hart LLP

(57) ABSTRACT

Methods, systems, and devices for wireless communications are described. The described techniques provide for a user equipment (UE) using information identified via radio access technology (RAT) (e.g., Long Term Evolution (LTE)) to support communications in another RAT (e.g., New Radio (NR)). For example, the UE may receive, from a first base station operating according to a first radio access technology an indication of a high speed associated with a first wireless connection of the UE with the first base station. The UE may perform a channel estimation procedure for the first wireless connection to generate a Doppler value based on receiving the indication. The UE may apply the generated Doppler value to a frequency tracking loop or a time tracking loop for communications with a second base station via a second wireless connection, wherein the second base station is operating according to a second RAT.

20 Claims, 11 Drawing Sheets

(56) References Cited

U.S. PATENT DOCUMENTS

| | | | | |
|---|---|---|---|---|
| 2008/0233958 A1* | 9/2008 | Robbins | .............. | H04W 36/324 |
| | | | | 455/436 |
| 2012/0315915 A1* | 12/2012 | Ohm | .................... | H04W 36/08 |
| | | | | 455/436 |
| 2015/0045040 A1* | 2/2015 | Lai | ...................... | H04W 36/302 |
| | | | | 455/441 |
| 2017/0034757 A1* | 2/2017 | Yang | ................... | H04W 56/001 |
| 2017/0295596 A1 | 10/2017 | Chen et al. | | |
| 2018/0049078 A1* | 2/2018 | Yang | .................... | H04W 8/245 |
| 2019/0159102 A1 | 5/2019 | Ryu et al. | | |

FOREIGN PATENT DOCUMENTS

| | | | | |
|---|---|---|---|---|
| EP | 2360967 A1 | 8/2011 | | |
| WO | WO-2004023679 A2 | 3/2004 | | |
| WO | WO-2010104980 | 9/2010 | | |
| WO | WO-2014032908 A2 * | 3/2014 | .......... | H04W 36/324 |
| WO | WO-2016122377 A1 * | 8/2016 | .......... | H04W 72/542 |
| WO | WO-2018052565 | 3/2018 | | |
| WO | WO-2018068811 A1 * | 4/2018 | .......... | H04W 84/047 |
| WO | WO-2020237551 | 12/2020 | | |

OTHER PUBLICATIONS

Ericsson: "On Adapting Random Access Procedures for NTN", 3GPP TSG-RAN WG1 Meeting #97, R1-1907393, May 17, 2019 (May 17, 2019), 10 Pages, The Whole Document.
International Search Report and Written Opinion—PCT/CN2021/079230—ISA/EPO—Dec. 7, 2021-12-07 (204762WO1).

\* cited by examiner ent (UE) is described. The method may include receiving, from a first base station operating according to a first radio access technology, an indication of a high speed associated with a first wireless connection of the UE with the first base station, performing, based on receiving the indication of the high speed, a channel estimation procedure for the first wireless connection to generate a Doppler value, and communicating with a second base station operating according to a second radio access technology based on applying the generated Doppler value to a frequency tracking loop or a time tracking loop for a second wireless connection of the UE with the second base station.

CHANNEL ESTIMATION FOR MULTIPLE RADIO ACCESS TECHNOLOGIES IN A HIGH SPEED SCENARIO

CROSS REFERENCE

The present Application is a 371 national stage filing of International PCT Application No. PCT/CN2021/079230 by LIU et al. entitled "CHANNEL ESTIMATION FOR MULTIPLE RADIO ACCESS TECHNOLOGIES IN A HIGH SPEED SCENARIO," filed Mar. 5, 2021, which is assigned to the assignee hereof, and which is expressly incorporated by reference in its entirety herein.

FIELD OF TECHNOLOGY

The following relates to wireless communications, including channel estimation for multiple radio access technologies in a high speed scenario.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a wireless communications device, such as a user equipment (UE) or base station may support communications via more than one multiple-access system. For example, a UE may be configured to communicate via both LTE and NR procedures. In some cases, the UE may utilize LTE and NR simultaneously or contemporaneously.

SUMMARY

The described techniques relate to improved methods, systems, devices, and apparatuses that support channel estimation for multiple radio access technologies in a high speed scenario. Generally, the described techniques provide for a user equipment (UE) using information identified via radio access technology (RAT) (e.g., Long Term Evolution (LTE)) to support communications in another RAT (e.g., new radio (NR)). For example, the UE may receive, from a first base station operating according to a first radio access technology, an indication of a high speed associated with a first wireless connection of the UE with the first base station. The indication of the high speed may be transmitted in system information, such as a system information block type 2 (SIB2). The UE may perform a channel estimation procedure for the first wireless connection to generate a Doppler value based on receiving the indication. The UE may apply the generated Doppler value to a frequency tracking loop or a time tracking loop for communications with a second base station via a second wireless connection, wherein the second base station is operating according to a second RAT.

A method for wireless communications at a user equipment (UE) is described. The method may include receiving, from a first base station operating according to a first radio access technology, an indication of a high speed associated with a first wireless connection of the UE with the first base station, performing, based on receiving the indication of the high speed, a channel estimation procedure for the first wireless connection to generate a Doppler value, and communicating with a second base station operating according to a second radio access technology based on applying the generated Doppler value to a frequency tracking loop or a time tracking loop for a second wireless connection of the UE with the second base station.

An apparatus for wireless communications at a UE is described. The apparatus may include a processor, memory coupled with the processor, and instructions stored in the memory. The instructions may be executable by the processor to cause the apparatus to receive, from a first base station operating according to a first radio access technology, an indication of a high speed associated with a first wireless connection of the UE with the first base station, perform, based on receiving the indication of the high speed, a channel estimation procedure for the first wireless connection to generate a Doppler value, and communicate with a second base station operating according to a second radio access technology based on applying the generated Doppler value to a frequency tracking loop or a time tracking loop for a second wireless connection of the UE with the second base station.

Another apparatus for wireless communications at a UE is described. The apparatus may include means for receiving, from a first base station operating according to a first radio access technology, an indication of a high speed associated with a first wireless connection of the UE with the first base station, means for performing, based on receiving the indication of the high speed, a channel estimation procedure for the first wireless connection to generate a Doppler value, and means for communicating with a second base station operating according to a second radio access technology based on applying the generated Doppler value to a frequency tracking loop or a time tracking loop for a second wireless connection of the UE with the second base station.

A non-transitory computer-readable medium storing code for wireless communications at a UE is described. The code may include instructions executable by a processor to receive, from a first base station operating according to a first radio access technology, an indication of a high speed associated with a first wireless connection of the UE with the first base station, perform, based on receiving the indication of the high speed, a channel estimation procedure for the first wireless connection to generate a Doppler value, and communicate with a second base station operating according to a second radio access technology based on applying the generated Doppler value to a frequency tracking loop or a time tracking loop for a second wireless connection of the UE with the second base station.

Some examples of the method, apparatuses, and non-transitory computer-readable medium described herein may further include operations, features, means, or instructions for receiving a command to perform a handover procedure to the second base station, generating, based on receiving the command, a random access preamble for the handover procedure with the second base station using the Doppler value generated using the channel estimation procedure with the first base station, where communicating with the second base station includes, and transmitting, to the second base station, the generated random access preamble in response to the received command.

In some examples of the method, apparatuses, and non-transitory computer-readable medium described herein, the Doppler value includes a first Doppler value and the method, apparatuses, and non-transitory computer-readable medium may include further operations, features, means, or instructions for performing a second channel estimation procedure to generate a second Doppler value associated with communications with the second base station operating using the second radio access technology and applying the second Doppler value to communications with the first base station using the first radio access technology.

In some examples of the method, apparatuses, and non-transitory computer-readable medium described herein, applying the second Doppler value may include operations, features, means, or instructions for adjusting a frequency tracking loop or a time tracking loop for the first wireless connection with the first base station operating according to the first radio access technology.

Some examples of the method, apparatuses, and non-transitory computer-readable medium described herein may further include operations, features, means, or instructions for determining that a difference between the second Doppler value and the first Doppler value may be greater than or equal to a Doppler threshold and performing a new channel estimation procedure for the first wireless connection to generate a new Doppler value based on determining that the difference may be greater than or equal to the Doppler threshold.

Some examples of the method, apparatuses, and non-transitory computer-readable medium described herein may further include operations, features, means, or instructions for monitoring a decoding performance metric associated with downlink communications via the first radio access technology and downlink communications via the second radio access technology and adjusting the time tracking loop, the frequency tracking loop, or both for the first radio access technology, the second radio access technology, or both based on monitoring the decoding performance metric.

Some examples of the method, apparatuses, and non-transitory computer-readable medium described herein may further include operations, features, means, or instructions for determining, based on receiving the indication, a relationship between the first base station associated with the first radio access technology and the second base station associated with the second radio access technology by monitoring a first Doppler metric associated with the first radio access technology and a second Doppler metric associated with the second radio access technology during a monitoring period.

Some examples of the method, apparatuses, and non-transitory computer-readable medium described herein may further include operations, features, means, or instructions for applying an adjusted Doppler value to adjust the frequency tracking loop or the time tracking loop for the second wireless connection based on the generated Doppler value.

Some examples of the method, apparatuses, and non-transitory computer-readable medium described herein may further include operations, features, means, or instructions for determining the adjusted Doppler value based on a scaling factor associated with a second radio frequency spectrum band corresponding to the second radio access technology.

Some examples of the method, apparatuses, and non-transitory computer-readable medium described herein may further include operations, features, means, or instructions for applying the scaling factor when a difference between a first radio frequency spectrum band associated with the first radio access technology and the second radio frequency spectrum band may be greater than or equal to a frequency threshold.

In some examples of the method, apparatuses, and non-transitory computer-readable medium described herein, receiving the indication may include operations, features, means, or instructions for receiving, from the first base station, system information including the indication of the high speed.

In some examples of the method, apparatuses, and non-transitory computer-readable medium described herein, the system information may be a system information block type2 (SIB2) and the indication of the high speed may be a high speed flag in the system information block (SIB).

In some examples of the method, apparatuses, and non-transitory computer-readable medium described herein, the first radio access technology operates in a first radio frequency spectrum band and the second radio access technology operates in a second radio frequency spectrum band.

DETAILED DESCRIPTION

Figure 1:
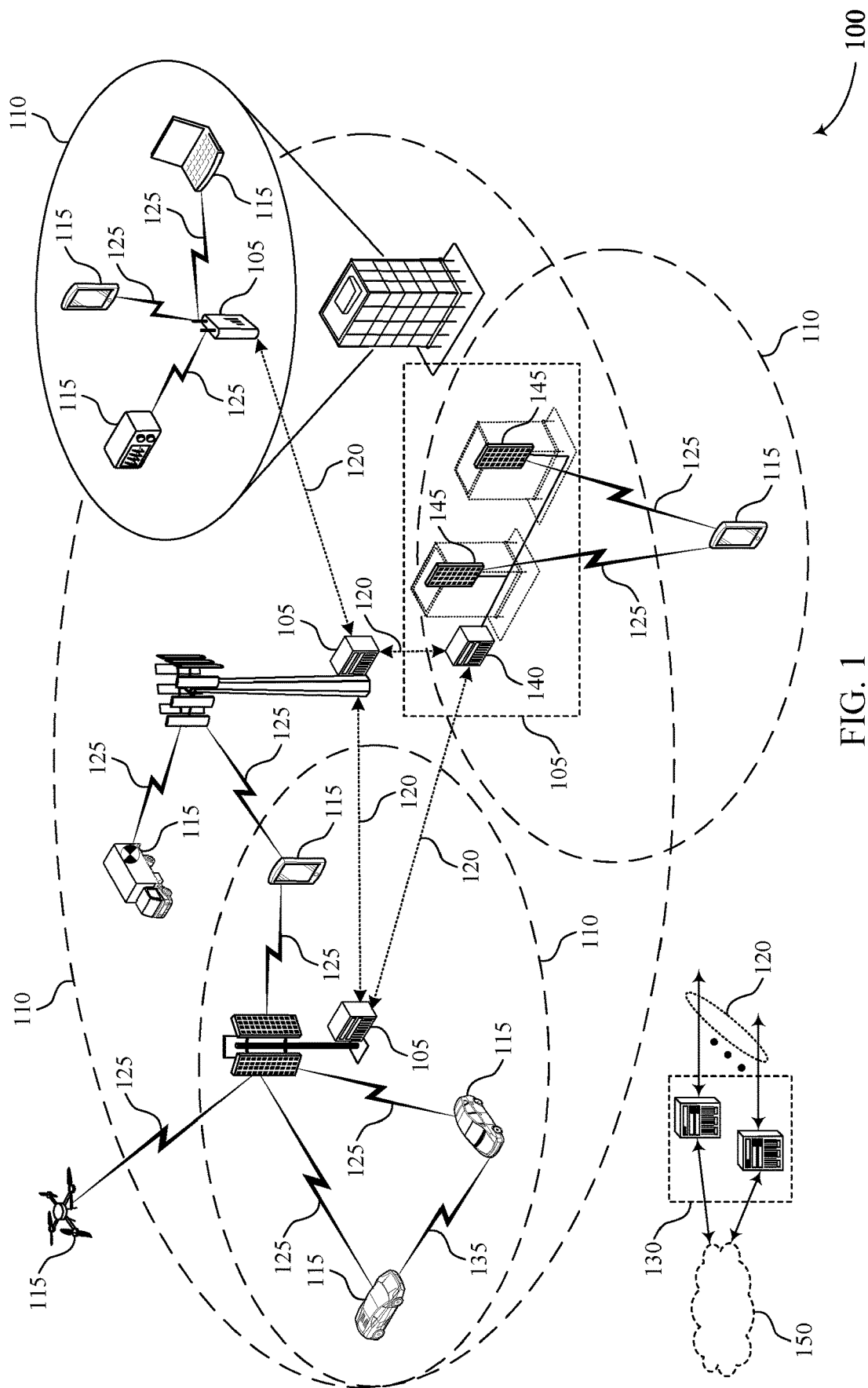
FIG. 1 illustrates an example of a wireless communications system that supports channel estimation for multiple radio access technologies in a high speed scenario in accordance with aspects of the present disclosure.

User equipments (UEs) may operate in high mobility environments, such as in trains, vehicles, etc. In new radio (NR) systems, base stations may be densely distributed in such environments to support communication on high frequencies (e.g., millimeter wave (mmW) frequencies). When UEs are operating in high mobility environments, the UEs may experience significant Doppler shifting of the communications between the UEs and the base stations. Such Doppler shifting may be particularly troublesome when communicating in high frequencies. For example, in high band NR systems, the UE may need to estimate when it is operating in a high mobility scenario using channel estimation procedures, which may use significant processing resources.

Aspects of the disclosure describe techniques for a UE to leverage information determined according to communications via a first radio access technology (RAT) (e.g., Long Term Evolution (LTE)) for communications via a second RAT (e.g., NR). For example, an LTE base station may transmit, to the UE, a set of system information (e.g., in a system information block (SIB) message) including a flag that indicates that the UE is operating a high mobility scenario (e.g., a high speed flag in SIB2). Upon identifying the high mobility flag for LTE, the UE may activate an operating mode allowing the UE to apply Doppler information (e.g., a Doppler value) generated using a channel estimation procedure on the first communication link (LTE) to the second communication link (NR). For example, the UE may apply the Doppler value to a time tracking loop (TTL) or frequency tracking loop (FTL) to the radio frequency chain (e.g., RF circuitry) corresponding to the NR communications. In some cases, the Doppler shift values may not be appropriate for the second communication link (e.g., due to differences in the frequency bands). To resolve this, in some examples, the UE may apply a scaling factor to the Doppler shift values before applying the Doppler shift values to the second communication link. The scaling factor may be based on channel conditions and may be predefined at the UE, signaled by a base station, or the like. Application of the Doppler value determined using LTE to NR communications may support improved channel estimation or acquisition. More particularly, channel estimation in high band NR may involve significant process overhead compared to LTE channel estimation. As such, rather than performing channel estimation in both RATs, the UE may use the channel estimation information (e.g., Doppler values) from a first RAT for communications in the second RAT.

Additionally or alternatively, information identified for one RAT may be used to determine the communication efficiency in the other RAT. That is, the UE may use information in either RAT to cross-check communications in the other RAT. For example, the UE may compare decoding performance, Doppler metrics, and the like, for both RATs in order to determine whether communications in one or both RATs are to be adjusted. In some examples, adjusting the communications may include applying outputs of an FTL or TTL one RAT to the FTL or TTL in the other RAT. These and other techniques are further described with respect to the figures.

Aspects of the disclosure are initially described in the context of wireless communications systems. Aspects of the discourse are further described with respect to a UE operating in a high speed scenario and a process flow diagram. Aspects of the disclosure are further illustrated by and described with reference to apparatus diagrams, system diagrams, and flowcharts that relate to channel estimation for multiple radio access technologies in a high speed scenario.

FIG. 1 illustrates an example of a wireless communications system 100 that supports channel estimation for multiple radio access technologies in a high speed scenario in accordance with aspects of the present disclosure. The wireless communications system 100 may include one or more base stations 105, one or more UEs 115, and a core network 130. In some examples, the wireless communications system 100 may be a LTE network, an LTE-Advanced (LTE-A) network, an LTE-A Pro network, or a NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support mmW communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Some UEs 115 and/or base stations 105 may operate in a high mobility environment, such as a high speed train environment. In such environments, base stations 105 may be distributed along the track or other fixed path in which UEs 115 may travel with a high speed. In such cases, it may be difficult for a UE 115 to perform channel estimation for decoding performance due to the high speed. This difficulty may be more pronounced in NR communications due to the high operating frequencies. Some RATs, such as LTE, may support a high speed indicator that the UE may use to improve channel estimation. However, other RATs, such as NR, may not support such an indicator and may rely on the UE 115 to detect when it is operating in a high speed scenario, but such detection may be associated with resource overhead.

Implementations described herein support a UE 115 leveraging information determined for a first RAT (e.g., LTE) for communications via a second RAT (e.g., NR). In some examples, these techniques may be applicable in a non-standalone (NSA) network, where the LTE and NR access points may be collocated or implemented in the same access point. In such cases, a UE 115 may receive an indication that the UE 115 is operating in high speed. The indication may be an example of a high speed flag of a SIB2. Upon receipt of the indication, the UE 215 may activate an operating mode allowing the UE to apply a Doppler value determined using a channel estimation procedure in a first RAT (e.g., LTE) to communications in a second RAT (e.g., NR). The Doppler value may be applied to the FTL or TTL in the second RAT. Using these and other techniques described herein, the UE 115 may enhance communication efficiency and reduce processing overhead by reducing or limiting UE channel estimation in one of the RATs.

Figure 2:
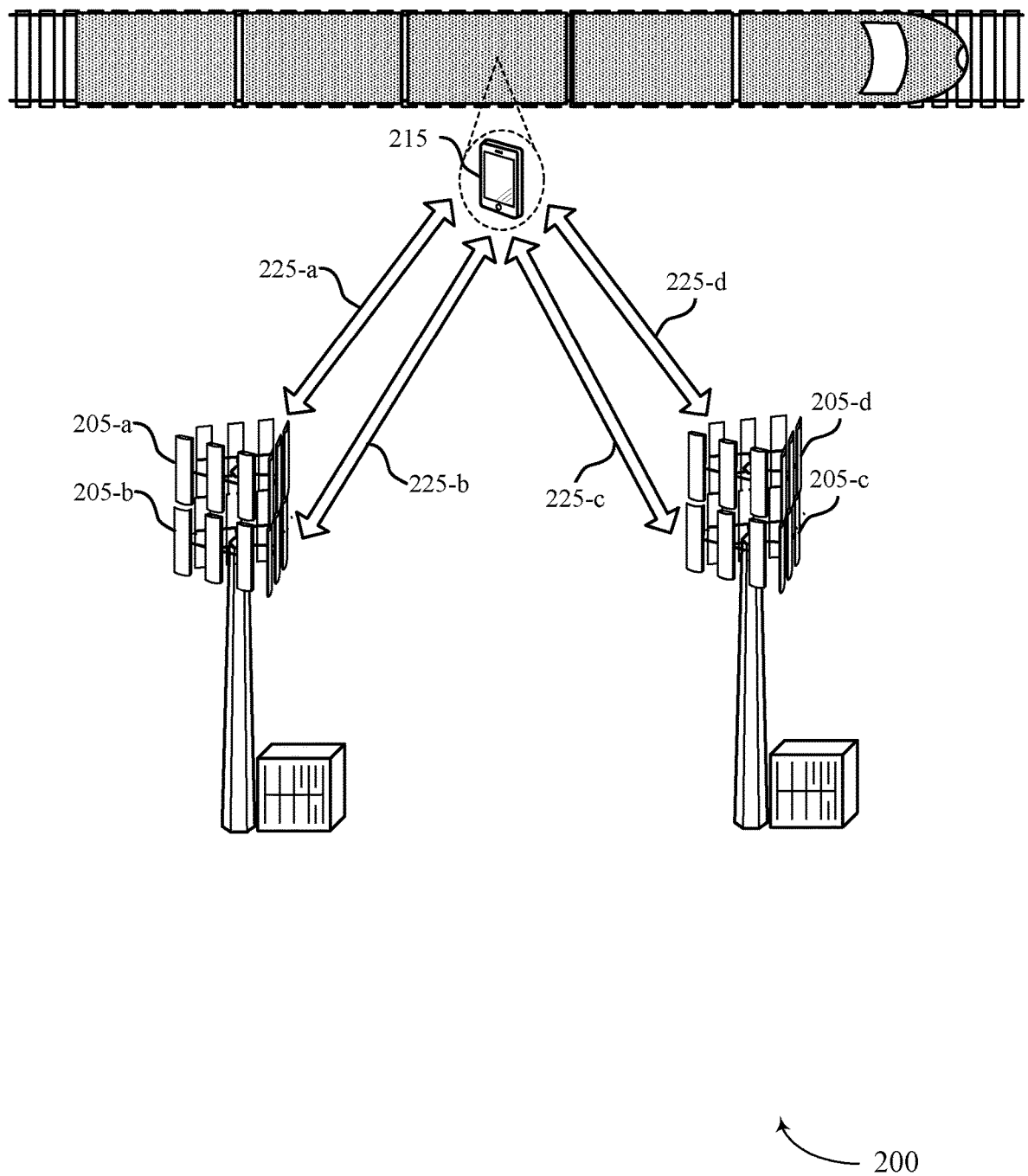
FIG. 2 illustrates an example of a wireless communications system that supports channel estimation for multiple radio access technologies in a high speed scenario in accordance with aspects of the present disclosure.

FIG. 2 illustrates an example of a wireless communications system 200 that supports channel estimation for multiple radio access technologies in a high speed scenario in accordance with aspects of the present disclosure. In some examples, wireless communications system 200 may include a UE 215, base stations 205, or the like, which may be examples of corresponding devices described with reference to FIG. 1. For instance, base stations 205 may be examples of base stations 105, access network transmission entities 145, repeaters, transmit receive points (TRPs), remote radio heads (RRHs), access points (APs), or any combination thereof. Further, base stations 205 may serve the same geographic area or different geographic areas. In some cases, one or more base stations may be collocated with one another. For instance, base station 205-*a* may be collocated with base station 205-*b*. In some cases, the collocated base stations (e.g., base station 205-*a* and 205-*b*) may represent a multiple cells supported by a same access point. For example, the base station 205-*a* may represent a first cell and the base station 205-*b* may represent a second cell. Accordingly, the base station 205-*a* and 205-*b* may correspond to a same access point. Wireless communications system 200 may also include a high speed train 210. In general, high speed train 210 may be an example of any high mobility device (e.g., a car) which may travel at a high speed. High speed train 210 may carry any number of UEs 215, configured to support implementations described herein.

In some cases, wireless communications system 200 may support multiple RATs. For example, base stations 205-*a* and 205-*d* (or aspects of the corresponding access points) may be examples of LTE base stations, while base stations 205-*b* and 205-*c* (or aspects of the corresponding access points) may be examples of NR base stations. These the respective base stations may support different communications bandwidths. More particularly, the LTE base stations may support communications in radiofrequency bands corresponding to LTE communications, while the NR base stations may support communications in NR radio frequency bandwidths (e.g., mmW frequencies). In some examples, the different RATs may be implemented using a non-standalone (NSA) deployment, such that a first RAT (e.g., LTE) may be used to support communication in a second RAT (e.g., NR). In order to support the NSA deployment, the respective base stations may be collocated, or the different RATs may be implemented in the same access point, as described herein and as depicted in FIG. 2. Further, the UE 215 may be implemented with various components, such as respective RF chains, in order to support communications via multiple RATs, such as LTE and NR.

In some cases, the base stations 205 may positioned along the train track in a manner to provide a continuous or near continuous coverage for UEs 215 of the high speed train 210. In such cases, the base stations 205 may be distributed to support communication on various frequencies, such as high frequencies (e.g., mmW frequencies). However, the high speed travel (e.g., via the high speed train 210) of UE 215 combined with communicating on various frequencies with distributed base stations 205 may cause communication challenges including high Doppler variation and difficulty in efficiently estimating channel conditions. Doppler variations (e.g., Doppler shift, Doppler spread, path delays) may occur when a transmitter, or a receiver, or both are moving in relation to one another. The relative movement may shift and/or spread the frequency of the signal, making the frequency of the signal different at the receiver than at the transmitter. As such, the frequency perceived by the receiver may differ from the frequency at which the signal was originally transmitted. For example, UE 215 may receive transmissions from base station 205-*a* via communication link 225*a* and transmissions from base station 205-*d* via communication link 225*d* while the UE 215 moves at a speed away from the base station 205-*a* and towards base station 205-*d*. The transmissions received by the UE 215 from base stations 205-*a* and 205-*d* may both experience Doppler shift, or Doppler spread, or both where the Doppler shift and spread of the two transmissions may be different (e.g., the UE 215 receives a lower frequency than the frequency of transmission from base station 205-*a* and a higher frequency than the frequency of transmission from base station 205-*d*). In some cases, the Doppler shift may be equal and opposite.

In some cases, the Doppler shift may be significant enough to introduce communication failures. For instance, if the UE 215 monitors a frequency range for transmissions from a base station 205, and the Doppler shift is large enough, the UE 215 may receive the transmission at a different frequency outside of the monitoring frequency range (e.g., overlapping with or separate from the monitoring frequency range), thereby interrupting the communications between the UE 215 and the base station 205. Therefore, various techniques may be used to account for Doppler shifting in wireless communications systems.

In some RATs, such as LTE, base stations 205 notify the UEs 215 when the UE is operating in a high speed scenario. In some cases, the base stations 205 may determine that the UE 115 is operating in the high speed scenario due to information or signals received from the UE 115 and/or by monitoring the velocity of the UE. For instance, base station 205-*b* may be an example of an LTE base station. The UE 215 may communicate with the base station 205-*b* via communication link 225*b* using LTE communication protocols. As the UE 215 travels with the high speed train 210, the base station 205-*b* may monitor the velocity of the UE 215 or determine that the UE 215 is operating in high speed due to signals (e.g., reference signals) received from the UE 215. In some examples, the base station 205-*b* may transmit system information (e.g., a system information block (SIB) type 2), to the UE 215, including an indication of a high speed (e.g., a highSpeedFlag). If the UE 215 receives an indication that the UE 215 is operating in a high speed scenario (e.g., the high speed flag is true), then the UE 215 may perform one or more various procedures in order to account for the high speed scenario. In one example, when the high speed flag is true, the UE 215 may determine a random access channel (RACH) request preamble using a cyclic shift interval (e.g., N_CS) that is based on the indication of the high speed scenario. More particularly, the UE 215 may use a first set of cyclic shift intervals (e.g., a restricted set) when the UE 215 is not operating in the high speed scenario (e.g., highSpeedFlag is False) and the UE 215 may use a second set of cyclic shift intervals (e.g., an unrestricted set) when the UE 215 is operating in the high speed flag scenario (e.g., highSpeedFlag is True). It should be understood that the UE 215 may perform other procedures differently based on the high speed indication.

Additionally or alternatively, the UE 215 may use a frequency tracking loop (FTL) or a time tracking loop (TTL) so as to mitigate the Doppler shifting inherent to high speed travel. The FTL may be used by the UE 215 in order to account for errors in frequency detection (e.g., due to Doppler shifting), while a time tracking loop (time-delay tracking loop) may be used to account for time delays between the UE 215 and the base stations 205. In some cases, the UE 215 may perform a channel estimation procedure that results in a Doppler value, among other channel metrics. The Doppler value may be used to adjust or may be applied to the FTL or TTL in order to provide more accurate frequency and time-delay tracking.

In some cases, base stations 205 may not transmit system information including an indication of a high speed. For instance, base station 205-*a* may be an NR base station that is not configured to indicate that the UE is operating in a high mobility environment. In such cases, a UE 115 may use various procedures, such as a channel estimation procedure, to detect that the UE 215 is operating in a high mobility environment. However, high mobility detection may incur significant resource overhead. Further, due to the high mobility and speed of the UE (e.g., on the high speed train 210), repeating the high speed detection (e.g., channel estimation) may significantly increase this overhead.

The techniques described herein may provide for a UE 215 to use high speed information from a first base station 205 (e.g., an LTE base station) for communications with a second base station (e.g., an NR base station).

As described herein, UE 215 may be equipped to support multiple communications via multiple RATs. For instance, UE 215 may be equipped with an LTE RAT component and an NR RAT component. Each RAT component may correspond to the RF circuitry and logic associated with the communications in the different RATs. In such cases, UE 215 may be able to communicate with more than one base station using the multiple RATs. For instance, base station 205-*b* may be an example of an LTE base station and base station 205-*a* may be an NR base station. The UE 215 may communicate with the base station 205-*a* on communication link 225*a* via NR while the UE 215 may communicate with the base station 205-*b* on communication link 225*b* via LTE. As described herein, as mobility detection in NR may be resource intensive, the UE 215 may utilize the information received via communication link 225*b* with the base station 205-*b* (e.g., the LTE link) to support communications via the communication link 225*a* with the base station 205-*a* (e.g., the NR link) and vice versa.

For example, upon receipt of the indication of the high speed (e.g., the highSpeedFlag is True), the UE 115 may determine to apply information determined using LTE procedures to communications via NR. In one example, the UE 115 may apply a Doppler value (e.g., a frequency offset or value) resulting from a channel estimation procedure on the LTE link (e.g., communication link 225-*b*) to communications on the NR link (e.g., communication link 225-*a*). This Doppler value may be applied to the FTL and/or the TTL corresponding to the NR communications. Thus, rather performing a channel estimation procedure to generate a Doppler value in NR, which may be resource intensive, the UE 215 may apply the Doppler value determined using the LTE link, which may result in reduced processing and resource overhead.

In some cases, the UE 215 may identify a relationship (e.g., collocation, proximal frequency bands, non-standalone (NSA) deployment, standalone (SA) deployment, etc.) between the base station 205-*a* and the base station 205-*b* based on receiving the indication of the high speed. To determine the relationship between the base stations 205-*a* and 205-*b*, during a monitoring period, the UE 215 may monitor a first Doppler metric (e.g., determined using a channel estimation procedure) associated with the first RAT and a second Doppler metric associated with the second RAT. By comparing these Doppler metrics, the UE 215 may determine whether the base stations associated with the different RATs are collocated or positioned in another pattern, such as an alternating pattern. In some cases, the UE 215 may determine Doppler values for each RAT (e.g., using respective channel estimation procedures) and determine to drop the determined Doppler values due to the differences between the metrics. More particularly, if the metrics indicate that there may be some error in Doppler shift estimation (e.g., the difference between the values is greater than a Doppler threshold difference), then the UE 215 may determine to drop the Doppler values and perform a new channel estimation procedure for one or both RATs to determine a new Doppler value.

As described, the UE 215 may use the Doppler values corresponding to the communications between the base stations 205-*a* and 205-*b* and the UE 215 to adjust the communication links 225. For instance, the UE 215 may apply the first Doppler value to adjust an FTL or a TTL for the NR communication link 225-*a*. In some examples, the UE 215 may directly apply the Doppler value to the communications between the base station 205-*a* and the UE 215. However, the Doppler value (which corresponds to the LTE communication link 225-*b*) may not be appropriate for the NR communication link 225*a* due to differences in the radio frequency bandwidths. For example, the UE 215 may determine that the difference between a first radio frequency spectrum band associated with the NR communication link 225*a* and a second radio frequency spectrum associated with the LTE communication link 225*b* is greater than or equal to a frequency threshold. The frequency threshold may be signaled to the UE 215 by one or more of the base stations 205, predefined at the UE 215, autonomously determined, or the like. As such, the UE 215 may apply a scaling factor to the Doppler value before applying the Doppler value to the communications between the base station 205-*a* and the UE 215. The scaling factor may be signaled by one or more of the base stations 205, predefined at the UE 215, autonomously determined (e.g., calculated based on a frequency curve, trend, etc.), or the like. In other examples, the UE 215 may apply the second Doppler value to adjust an FTL or a TTL for the LTE communication link 225-*b*.

In some cases, the UE 215 may monitor a decoding performance metric associated with downlink communications (e.g., via LTE communication link 225*b* and NR communication link 225-*a*). The decoding performance metric may be an error rate, such as a bit rate error, a number of bit flips at the UE 215, a throughput, or the like. Based on monitoring the decoding performance metric, the UE 215 may determine that the quality of one or more communication links is unsatisfactory (e.g., the decoding performance metric satisfies a threshold value). As such, the UE 215 may adjust an FTL, a TTL, or both, for the NR communication link 225-*a*, the LTE communication link 225-*b*, or both. In some cases, adjusting the TTL, FTL, or both for one or more both RATs may include applying a Doppler value determined using a channel estimation procedure in the other RAT.

Further, as the UE 215 travels with the high speed train 210, the UE 215 may exit a coverage area corresponding to base stations 205-*a* and 205-*b*, entering a coverage area corresponding to base stations 205-*c* and 205-*d*. In such a case, the UE 215 may receive a handover command to initiate a handover procedure (e.g., a random access procedure). Likewise, the UE 215 may drop the communication links 225*a* and 225*b* and establish a communication links 225-*c* and 225*d* with the base stations 205-*c* and 205-*d*, respectively. As part of a random access procedure, and to establish communications with at least one of the base stations 205-*c* and 205-*d*, the UE 215 may generate a random access preamble that is transmitted in a random access request to one or both of the base stations 205-*c* and 205-*d*. The UE 215 may generate the random access preamble based on a Doppler value that is generated using a channel estimation procedure using one of the RATs. For instance, if the UE 215 received an indication of a high speed (e.g., from base station 205-*b*), the UE 215 may use the generated Doppler value along with a set of cyclic shift intervals (e.g., corresponding to the high speed flag) to generate the random access preamble. As such, the UE 215 may transmit the random access preamble to the base station 205-*c* as part of a connection establishment procedure. More particularly, the UE 215 may use the indication of the high speed (e.g., highSpeedFlag is true) transmitted via a first RAT (e.g., LTE) and a Doppler value determined using a channel estimation procedure in the first RAT, to generate a random access preamble that is transmitted to another base station (e.g., base station 205-*d*) associated with a second RAT (e.g., NR) in a random access request.

The UE 215 may also support utilization of information from one RAT to support another RAT by applying an output of an FTL or TTL from one RAT to the other RAT. For example, the UE 215 may apply the output of the FTL or the TTL associated with LTE communications to the FTL or the TTL associated with the NR communications and vice versa (e.g., the UE applies the output of the NR TTL or FTL to the LTE TTL or FTL. The output may be a frequency offset/spread or a time delay. In some examples, application of the FTL or TTL may be useful in a handover scenario, which may result in a sudden frequency/time delay change or aliasing.

Applying information from communications with a first base station 205 via a first RAT to the communications with a second base station 205 via a second RAT may allow a UE 215 to support more efficient connections to the base stations 205, perform channel estimation procedures, and enhance system efficiency. Further, by monitoring various metrics (e.g., Doppler metrics) associated with the two RATs, the UE may use information identified using a first RAT to perform adjustments for communications via the second RAT.

Figure 3:
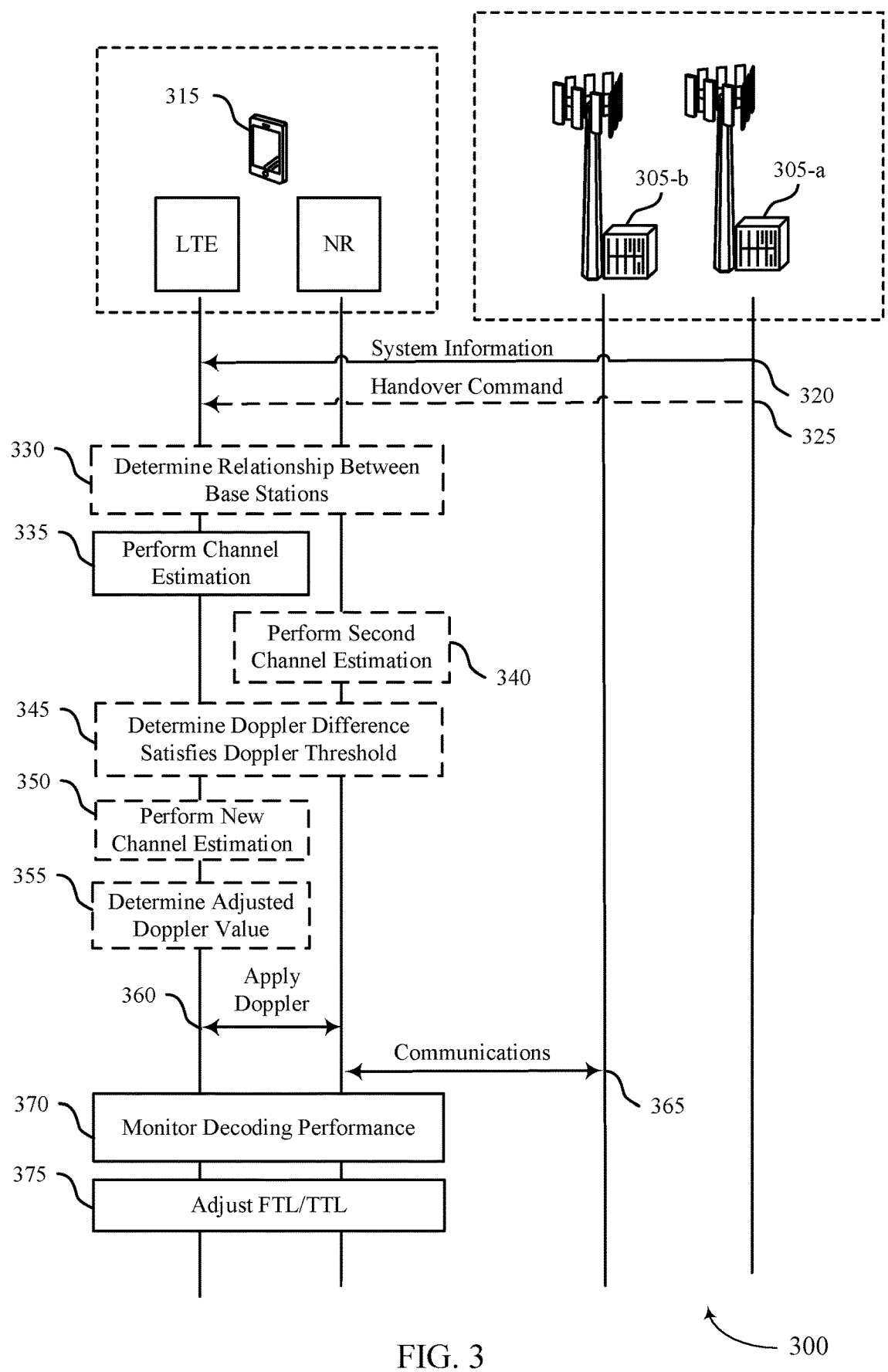
FIG. 3 illustrates an example of a process flow that supports channel estimation for multiple radio access technologies in a high speed scenario in accordance with aspects of the present disclosure.

FIG. 3 illustrates an example of a process flow 300 that supports channel estimation for multiple radio access technologies in a high speed scenario in accordance with aspects of the present disclosure. Process flow 300 may include UE 315 which may be examples of UE 115 or UE 215 as described with reference to FIGS. 1 and 2, respectively. Process flow 300 may include one or more wireless network devices (e.g., base stations 305) which may be examples of base station 105, base station 205, or the like, as described with reference to FIGS. 1 and 2.

UE 315 may be an example of a multi-RAT UE 315, where UE 315 may be equipped to support more than one RAT. For instance, UE 315 may be equipped to support both an LTE for communications with an LTE base station and a NR RAT for communications with an NR base station.

In some examples, base stations 305 may correspond to different RATs. For instance, base station 305-*a* may support LTE whereas base station 305-*b* may support NR. Additionally or alternatively, the base station 305-*a* or base station 305-*b*, or both, may be an example of a base station, an IAB node, a repeater node (e.g., configured with some retransmission capability), or the like. In some examples, base station 305-*a* and base station 305-*b* may be separate entities, located in different physical spaces. However, in some examples, base station 305-*a* and base station 305-*b* may be co-located, or may be the same network entity operating in the role of a first base station 305 (e.g., as part of a first communications system) and subsequently acting in the role of a second base station (e.g., as part of a second communications system). In some cases, base stations 305 may be included in a deployment (e.g., an NSA system or a SA system). An NSA system may employ the use of 4G core networks for the deployment of 5G communications where a SA system may employ the use of 5G core networks and devices for 5G deployments.

In some cases, formatting control information, reference signals, data transmissions, or the like, may vary between different RATs. For instance, base station 305-*a* (e.g., an LTE base station) may transmit control information including an indication of a high speed to UE 315 whereas base station 305-*b* (e.g., an NR base station) may not. The techniques described herein provide for UE 315 to apply high speed information from a first communication link to a second communication link.

At 320, base station 305-*a* may transmit system information to UE 315. In some cases, the base station 305-*a* may include an indication of a high speed within the system information. In some examples, the system information may be a SIB2 and the indication of the high speed may be a high speed flag. The UE 315 may receive the system information.

At 325, in some cases, the base station 305-*a* may also transmit a handover command, to the UE 315, to perform a handover procedure to the base station 305-*b*.

At 330, the UE 315 may determine a relationship between base station 305-*a* and 305-*b* based on receiving the indication at 320. The relationship may be a collocation of the base stations 305, a proximity of the carrier frequencies corresponding to the communications with the base stations 305, an NSA deployment, and SA deployment, or the like. Upon determining the relationship, the UE 315, during a monitoring period, monitor a first Doppler metric associated with the first radio access technology (e.g., LTE RAT) and monitor a second Doppler metric associated with the second radio access technology (e.g., NR RAT). The Doppler metric may be a Doppler value (e.g., a frequency offset), a time-delay, some other value corresponding to a Doppler effect, or a combination thereof.

At 335, the UE 315 may perform a channel estimation procedure for the first wireless connection (e.g., associated with the LTE RAT) to generate a Doppler value based on receiving the indication at 320. In some examples, if the UE 315 received the handover command at 325, the UE 315 may generate a random access preamble for the handover procedure (e.g., a random access request) with the base station 305-*a* which is described in more detail with reference to FIG. 2.

At 340, in some cases, the UE 315 may perform a second channel estimation procedure to generate a second Doppler value associated with communications with base station 305-*a*.

At 345, the UE 315 may determine that a difference between the second Doppler value and the first Doppler value (e.g., the Doppler value generated at 335) is greater than or equal to a Doppler threshold. The Doppler threshold may be signaled to the UE 315 by one or more of the base stations 305, predefined at the UE 315, autonomously determined, or the like.

At 350, upon determining that the difference between the first and second Doppler values is greater than or equal to the Doppler threshold, the UE 315 may perform a new channel estimation procedure to generate a new Doppler value.

At 355, in some cases, the UE 315 may identify that a difference between a first radio frequency spectrum associated with the first radio access technology (e.g., LTE RAT) and a second radio frequency spectrum associated with the second radio access technology (e.g., NR RAT) is greater than or equal to a frequency threshold. The frequency threshold may be signaled to the UE 315 by one or more of the base stations 305, predefined at the UE 315, autonomously determined, or the like. As such, the UE 315 may determine an adjusted Doppler value based on a scaling factor associated with a second radio frequency spectrum corresponding to the second radio access technology (e.g., NR RAT). The scaling factor may be signaled by one or more of the base stations 205, predefined at the UE 215, autonomously determined (e.g., calculated based on a frequency curve, trend, etc.), or the like.

At 360, the UE 315 may apply the Doppler value(s) to the communication links between the UE 315 and one or more of the base stations 305. For instance, the UE 315 may apply a generated Doppler value (e.g., the first Doppler value, the adjusted Doppler value, the new Doppler value, etc.) to the communication link between the UE 315 and the base station 305-*b*. Likewise, the UE 315 may apply another generated Doppler value (e.g., the second Doppler value, the new Doppler value, etc.) to the communication link between the UE 315 and the base station 305-*a*. Applying the Doppler value(s) to the communication links may include applying the Doppler value to an FTL or a TTL associated with the respective communication link. For example, the UE 315 may apply the first Doppler value to the FTL of the communication link between the UE 315 and the base station 305-*b*.

At 365, the UE 315 may communicate with the base station 305-*b*. The UE 315 may communicate with the base station 305-*b* based on applying the generated Doppler value at 360. In some cases, communicating with the base station 305-*b* may include transmitting, to the base station 305-*b*, the random access preamble generated at 335 in response to the handover command at 325.

At 370, the UE 315 may monitor a decoding performance metric associated with downlink communications via the first radio access technology (e.g., the LTE RAT) and downlink communications via the second radio access technology (e.g., the NR RAT). Monitoring decoding performance is described in more detail with reference to FIG. 2.

At 375, based on monitoring the decoding performance metric at 370, the UE 315 may adjust the FTL, the TTL, or both for the first radio access technology (e.g., the LTE RAT), the second radio access technology (e.g., the NR RAT), or both. In some cases, the UE 315 may adjust the FTL/TTL by applying an output of an FTL/TTL corresponding to one RAT (e.g., LTE) to the FTL/TTL corresponding to another RAT (e.g., NR).

Figure 4:
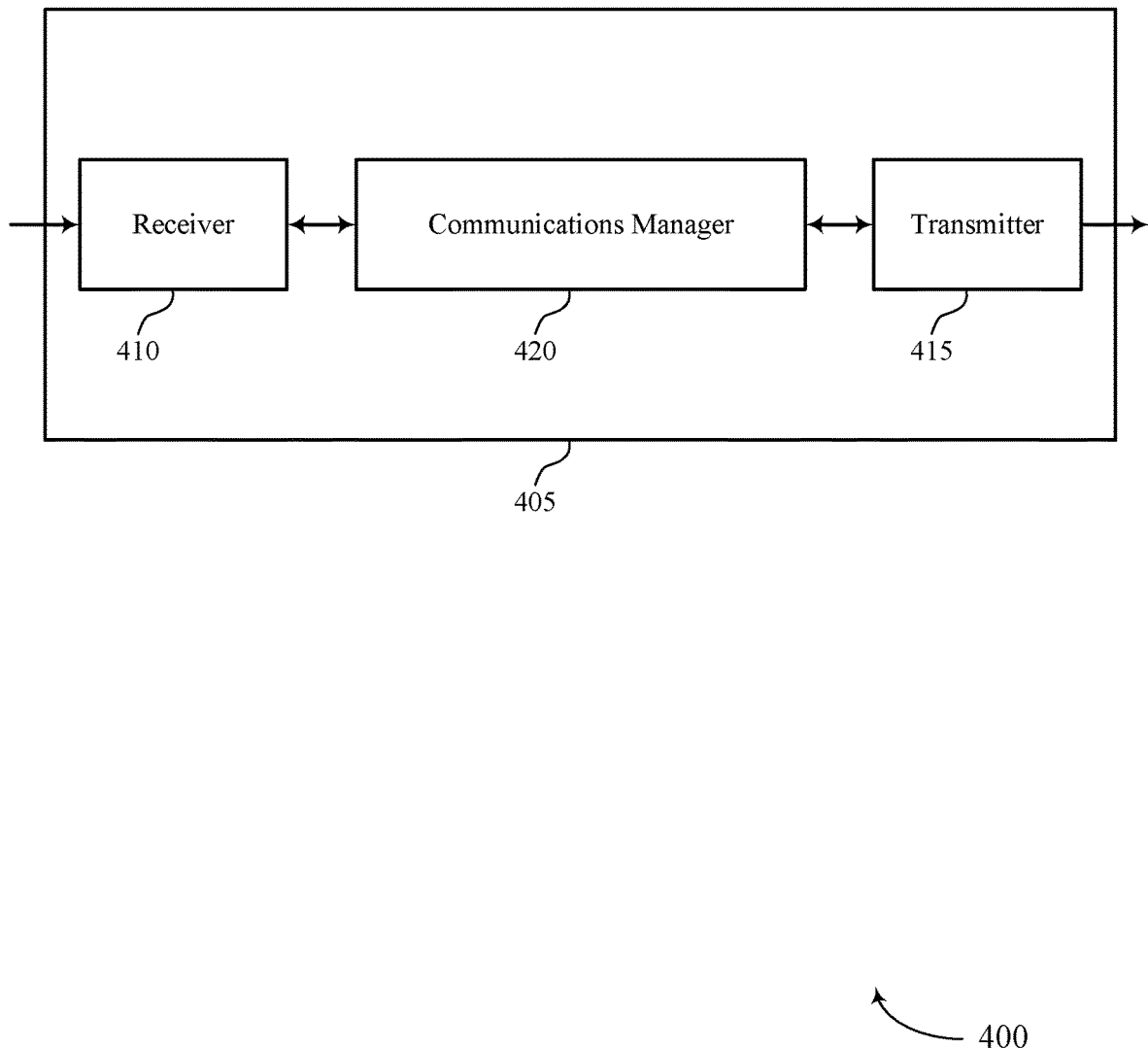
FIGS. 4 and 5 show block diagrams of devices that support channel estimation for multiple radio access technologies in a high speed scenario in accordance with aspects of the present disclosure.

FIG. 4 shows a block diagram 400 of a device 405 that supports channel estimation for multiple radio access technologies in a high speed scenario in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to channel estimation for multiple radio access technologies in a high speed scenario). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to channel estimation for multiple radio access technologies in a high speed scenario). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of channel estimation for multiple radio access technologies in a high speed scenario as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communications at a UE in accordance with examples as disclosed herein. For example, the communications manager 420 may be configured as or otherwise support a means for receiving, from a first base station operating according to a first radio access technology, an indication of a high speed associated with a first wireless connection of the UE with the first base station. The communications manager 420 may be configured as or otherwise support a means for performing, based on receiving the indication of the high speed, a channel estimation procedure for the first wireless connection to generate a Doppler value. The communications manager 420 may be configured as or otherwise support a means for communicating with a second base station operating according to a second radio access technology based on applying the generated Doppler value to a frequency tracking loop or a time tracking loop for a second wireless connection of the UE with the second base station.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for reducing processing overhead by reducing processor intensive channel estimation in high radio frequency bands (e.g., NR mmW bands) by using channel estimation information determined using a lower radio frequency band (e.g., an LTE band).

Figure 5:
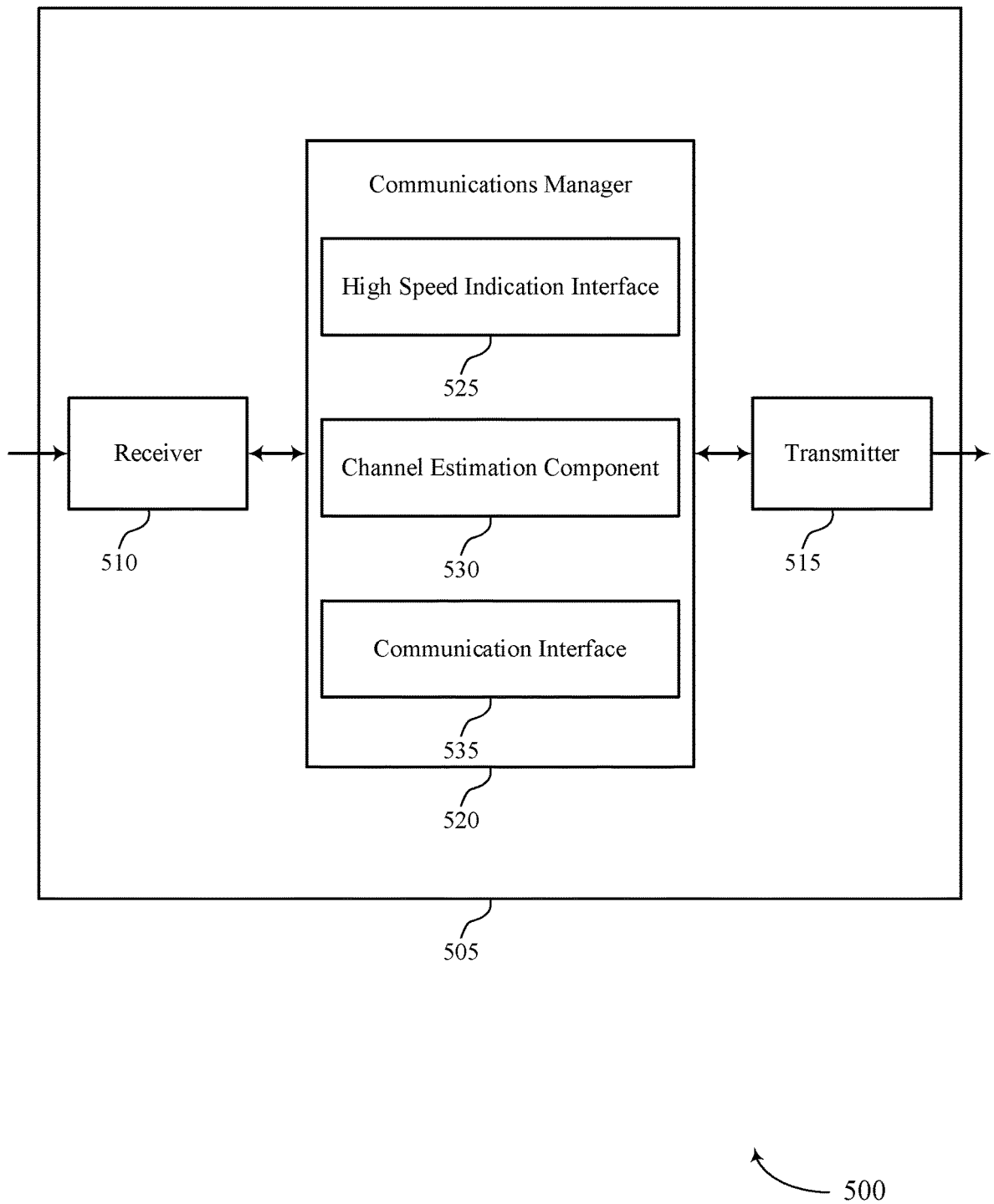

FIG. 5 shows a block diagram 500 of a device 505 that supports channel estimation for multiple radio access technologies in a high speed scenario in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to channel estimation for multiple radio access technologies in a high speed scenario). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to channel estimation for multiple radio access technologies in a high speed scenario). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of channel estimation for multiple radio access technologies in a high speed scenario as described herein. For example, the communications manager 520 may include a high speed indication interface 525, a channel estimation component 530, a communication interface 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. The high speed indication interface 525 may be configured as or otherwise support a means for receiving, from a first base station operating according to a first radio access technology, an indication of a high speed associated with a first wireless connection of the UE with the first base station. The channel estimation component 530 may be configured as or otherwise support a means for performing, based on receiving the indication of the high speed, a channel estimation procedure for the first wireless connection to generate a Doppler value. The communication interface 535 may be configured as or otherwise support a means for communicating with a second base station operating according to a second radio access technology based on applying the generated Doppler value to a frequency tracking loop or a time tracking loop for a second wireless connection of the UE with the second base station.

Figure 6:
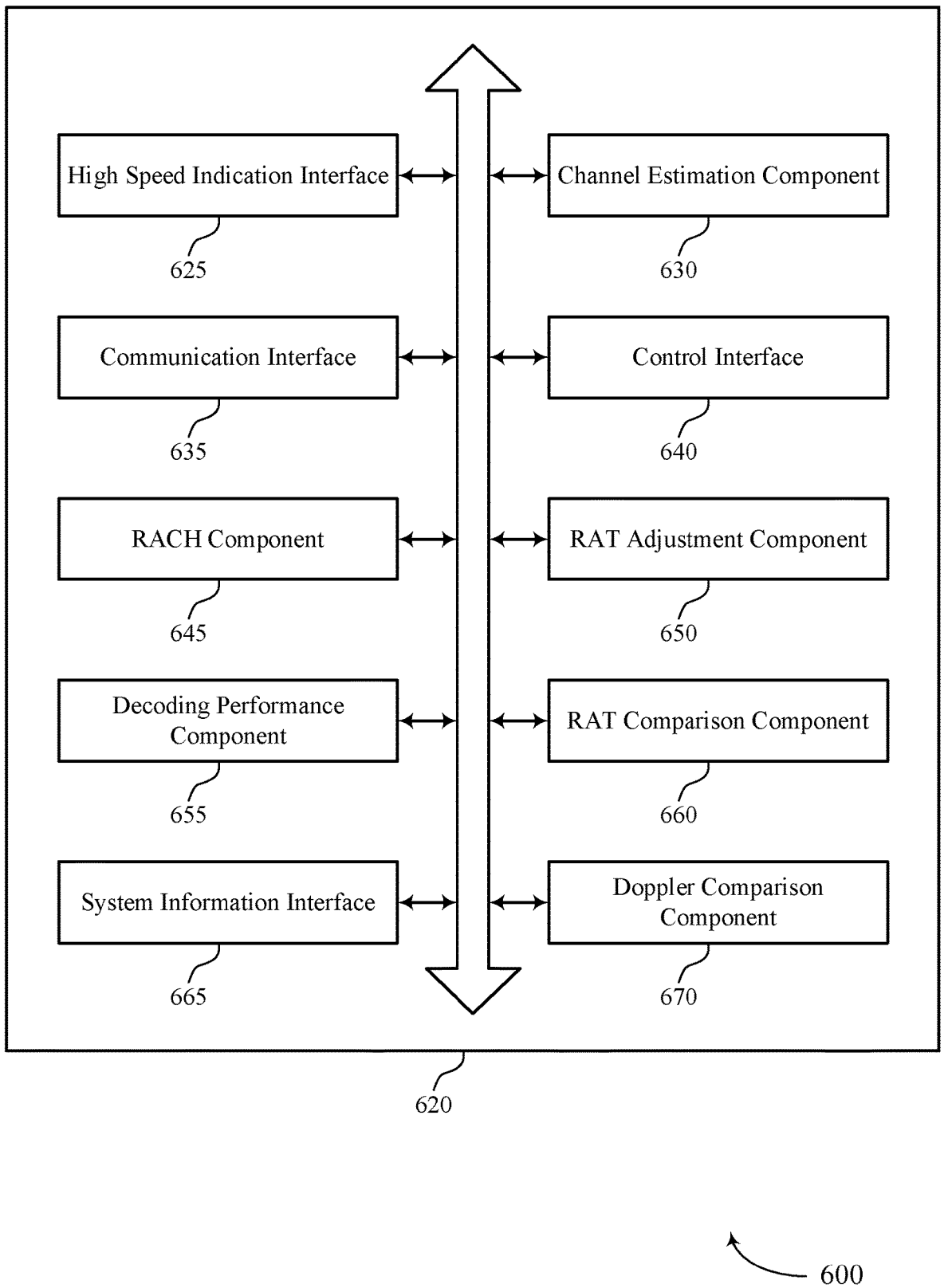
FIG. 6 shows a block diagram of a communications manager that supports channel estimation for multiple radio access technologies in a high speed scenario in accordance with aspects of the present disclosure.

FIG. 6 shows a block diagram 600 of a communications manager 620 that supports channel estimation for multiple radio access technologies in a high speed scenario in accordance with aspects of the present disclosure. The communications manager 620 may be an example of aspects of a communications manager 420, a communications manager 520, or both, as described herein. The communications manager 620, or various components thereof, may be an example of means for performing various aspects of channel estimation for multiple radio access technologies in a high speed scenario as described herein. For example, the communications manager 620 may include a high speed indication interface 625, a channel estimation component 630, a communication interface 635, a control interface 640, a RACH component 645, a RAT adjustment component 650, a decoding performance component 655, a RAT comparison component 660, a system information interface 665, a Doppler comparison component 670, or any combination thereof. Each of these components may communicate, directly or indirectly, with one another (e.g., via one or more buses).

The communications manager 620 may support wireless communications at a UE in accordance with examples as disclosed herein. The high speed indication interface 625 may be configured as or otherwise support a means for receiving, from a first base station operating according to a first radio access technology, an indication of a high speed associated with a first wireless connection of the UE with the first base station. The channel estimation component 630 may be configured as or otherwise support a means for performing, based on receiving the indication of the high speed, a channel estimation procedure for the first wireless connection to generate a Doppler value. The communication interface 635 may be configured as or otherwise support a means for communicating with a second base station operating according to a second radio access technology based on applying the generated Doppler value to a frequency tracking loop or a time tracking loop for a second wireless connection of the UE with the second base station.

In some examples, the control interface 640 may be configured as or otherwise support a means for receiving a command to perform a handover procedure to the second base station. In some examples, the RACH component 645 may be configured as or otherwise support a means for generating, based on receiving the command, a random access preamble for the handover procedure with the second base station using the Doppler value generated using the channel estimation procedure with the first base station, where communicating with the second base station includes.

In some examples, the RACH component 645 may be configured as or otherwise support a means for transmitting, to the second base station, the generated random access preamble in response to the received command.

In some examples, the Doppler value includes a first Doppler value, and the channel estimation component 630 may be configured as or otherwise support a means for performing a second channel estimation procedure to generate a second Doppler value associated with communications with the second base station operating using the second radio access technology. In some examples, the Doppler value includes a first Doppler value, and the RAT adjustment component 650 may be configured as or otherwise support a means for applying the second Doppler value to communications with the first base station using the first radio access technology.

In some examples, to support applying the second Doppler value, the RAT adjustment component 650 may be configured as or otherwise support a means for adjusting a frequency tracking loop or a time tracking loop for the first wireless connection with the first base station operating according to the first radio access technology.

In some examples, the Doppler comparison component 670 may be configured as or otherwise support a means for determining that a difference between the second Doppler value and the first Doppler value is greater than or equal to a Doppler threshold. In some examples, the channel estimation component 630 may be configured as or otherwise support a means for performing a new channel estimation procedure for the first wireless connection to generate a new Doppler value based on determining that the difference is greater than or equal to the Doppler threshold.

In some examples, the decoding performance component 655 may be configured as or otherwise support a means for monitoring a decoding performance metric associated with downlink communications via the first radio access technology and downlink communications via the second radio access technology. In some examples, the RAT adjustment component 650 may be configured as or otherwise support a means for adjusting the time tracking loop, the frequency tracking loop, or both for the first radio access technology, the second radio access technology, or both based on monitoring the decoding performance metric.

In some examples, the RAT comparison component 660 may be configured as or otherwise support a means for determining, based on receiving the indication, a relationship between the first base station associated with the first radio access technology and the second base station associated with the second radio access technology by monitoring a first Doppler metric associated with the first radio access technology and a second Doppler metric associated with the second radio access technology during a monitoring period.

In some examples, the RAT adjustment component 650 may be configured as or otherwise support a means for applying an adjusted Doppler value to adjust the frequency tracking loop or the time tracking loop for the second wireless connection based on the generated Doppler value.

In some examples, the RAT adjustment component 650 may be configured as or otherwise support a means for determining the adjusted Doppler value based on a scaling factor associated with a second radio frequency spectrum band corresponding to the second radio access technology.

In some examples, the RAT adjustment component 650 may be configured as or otherwise support a means for applying the scaling factor when a difference between a first radio frequency spectrum band associated with the first radio access technology and the second radio frequency spectrum band is greater than or equal to a frequency threshold.

In some examples, to support receiving the indication, the system information interface 665 may be configured as or otherwise support a means for receiving, from the first base station, system information including the indication of the high speed.

In some examples, the system information is a system information block type2 (SIB2) and the indication of the high speed is a high speed flag in the SIB.

In some examples, the first radio access technology operates in a first radio frequency spectrum band and the second radio access technology operates in a second radio frequency spectrum band.

Figure 7:
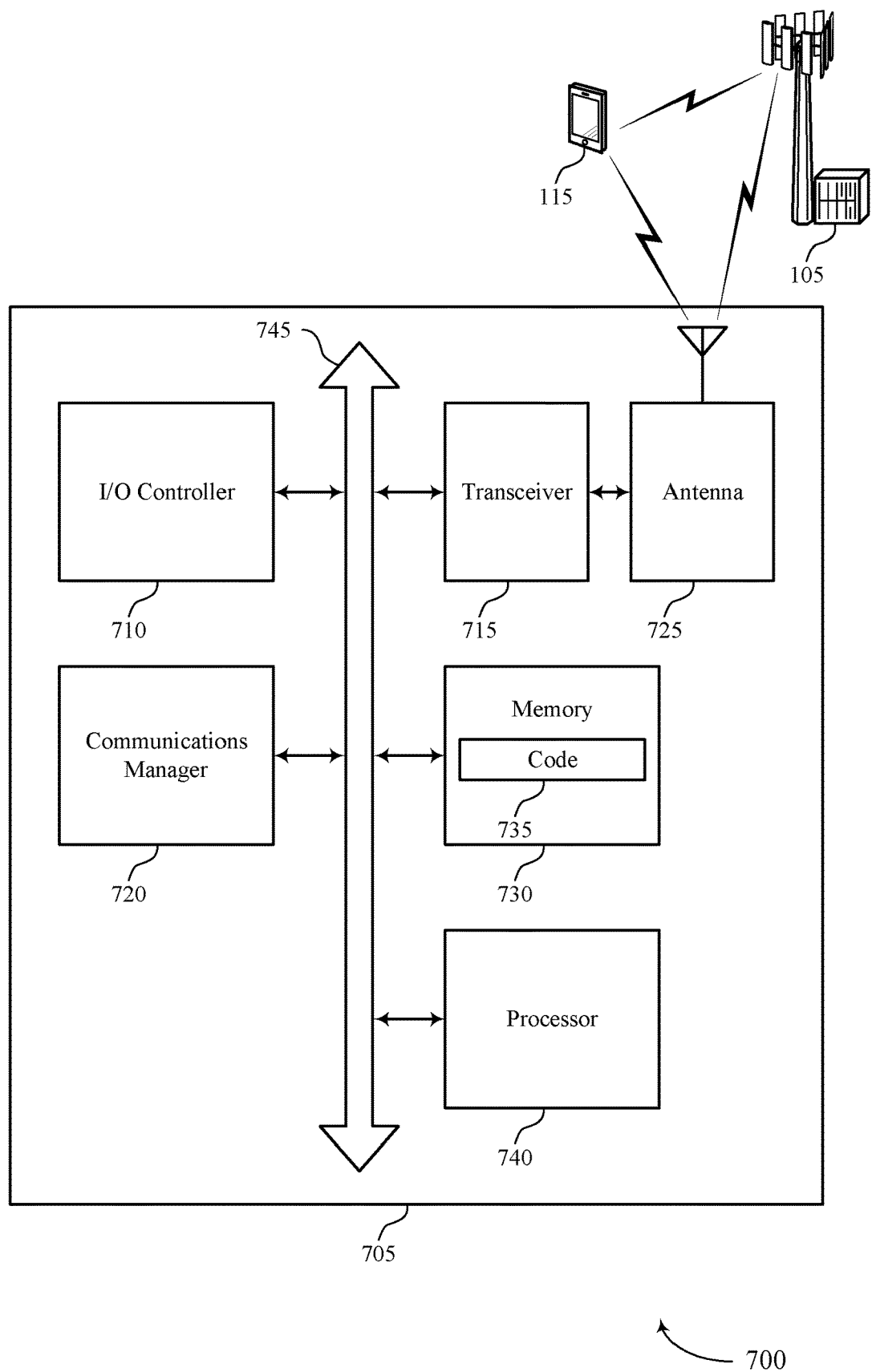
FIG. 7 shows a diagram of a system including a device that supports channel estimation for multiple radio access technologies in a high speed scenario in accordance with aspects of the present disclosure.

FIG. 7 shows a diagram of a system 700 including a device 705 that supports channel estimation for multiple radio access technologies in a high speed scenario in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting channel estimation for multiple radio access technologies in a high speed scenario). For example, the device 705 or a component of the device 705 may include a processor 740 and memory 730 coupled to the processor 740, the processor 740 and memory 730 configured to perform various functions described herein.

The communications manager 720 may support wireless communications at a UE in accordance with examples as disclosed herein. For example, the communications manager 720 may be configured as or otherwise support a means for receiving, from a first base station operating according to a first radio access technology, an indication of a high speed associated with a first wireless connection of the UE with the first base station. The communications manager 720 may be configured as or otherwise support a means for performing, based on receiving the indication of the high speed, a channel estimation procedure for the first wireless connection to generate a Doppler value. The communications manager 720 may be configured as or otherwise support a means for communicating with a second base station operating according to a second radio access technology based on applying the generated Doppler value to a frequency tracking loop or a time tracking loop for a second wireless connection of the UE with the second base station.

By including or configuring the communications manager 720 in accordance with examples as described herein, the device 705 may support techniques for improved communication reliability and efficient utilization of communication resources. For example, by applying a Doppler value determined using a channel estimation procedure performed for a first RAT (e.g., LTE) based on receiving an indication of high speed to another RAT (e.g., NR), the UE may avoid or limit using resources associated with channel estimation in the second RAT. Further, the UE may use communication information determined for one or both RATs to cross-check the communication efficiency in the other RAT in order to determine whether to adjust various aspects of communications.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of channel estimation for multiple radio access technologies in a high speed scenario as described herein, or the processor 740 and the memory 730 may be otherwise configured to perform or support such operations.

Figure 8:
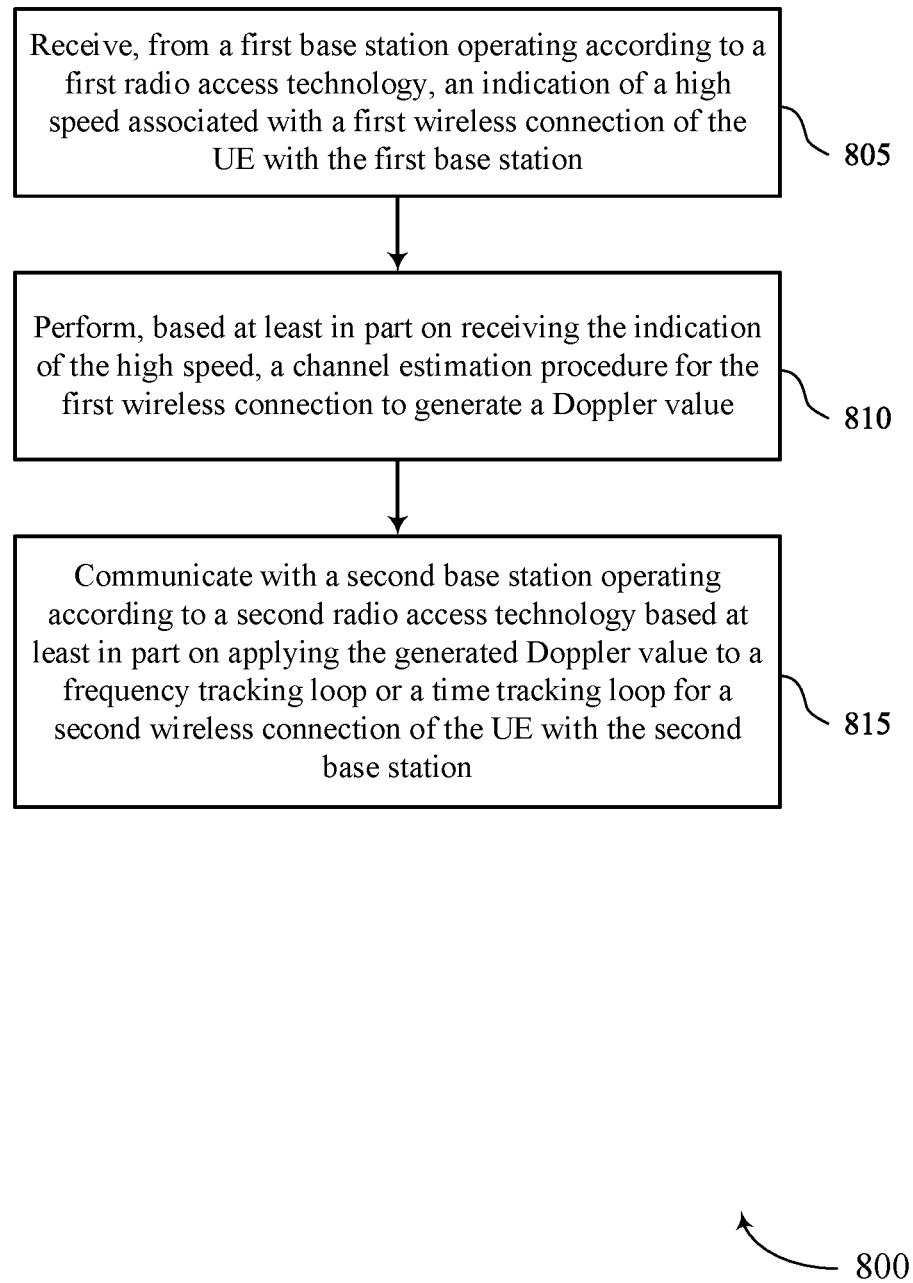
FIGS. 8 through 11 show flowcharts illustrating methods that support channel estimation for multiple radio access technologies in a high speed scenario in accordance with aspects of the present disclosure.

FIG. 8 shows a flowchart illustrating a method 800 that supports channel estimation for multiple radio access technologies in a high speed scenario in accordance with aspects of the present disclosure. The operations of the method 800 may be implemented by a UE or its components as described herein. For example, the operations of the method 800 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 805, the method may include receiving, from a first base station operating according to a first radio access technology, an indication of a high speed associated with a first wireless connection of the UE with the first base station. The operations of 805 may be performed in accordance with examples as disclosed herein. In some examples, aspects of the operations of 805 may be performed by a high speed indication interface 625 as described with reference to FIG. 6.

At 810, the method may include performing, based on receiving the indication of the high speed, a channel estimation procedure for the first wireless connection to generate a Doppler value. The operations of 810 may be performed in accordance with examples as disclosed herein. In some examples, aspects of the operations of 810 may be performed by a channel estimation component 630 as described with reference to FIG. 6.

At 815, the method may include communicating with a second base station operating according to a second radio access technology based on applying the generated Doppler value to a frequency tracking loop or a time tracking loop for a second wireless connection of the UE with the second base station. The operations of 815 may be performed in accordance with examples as disclosed herein. In some examples, aspects of the operations of 815 may be performed by a communication interface 635 as described with reference to FIG. 6.

Figure 9:
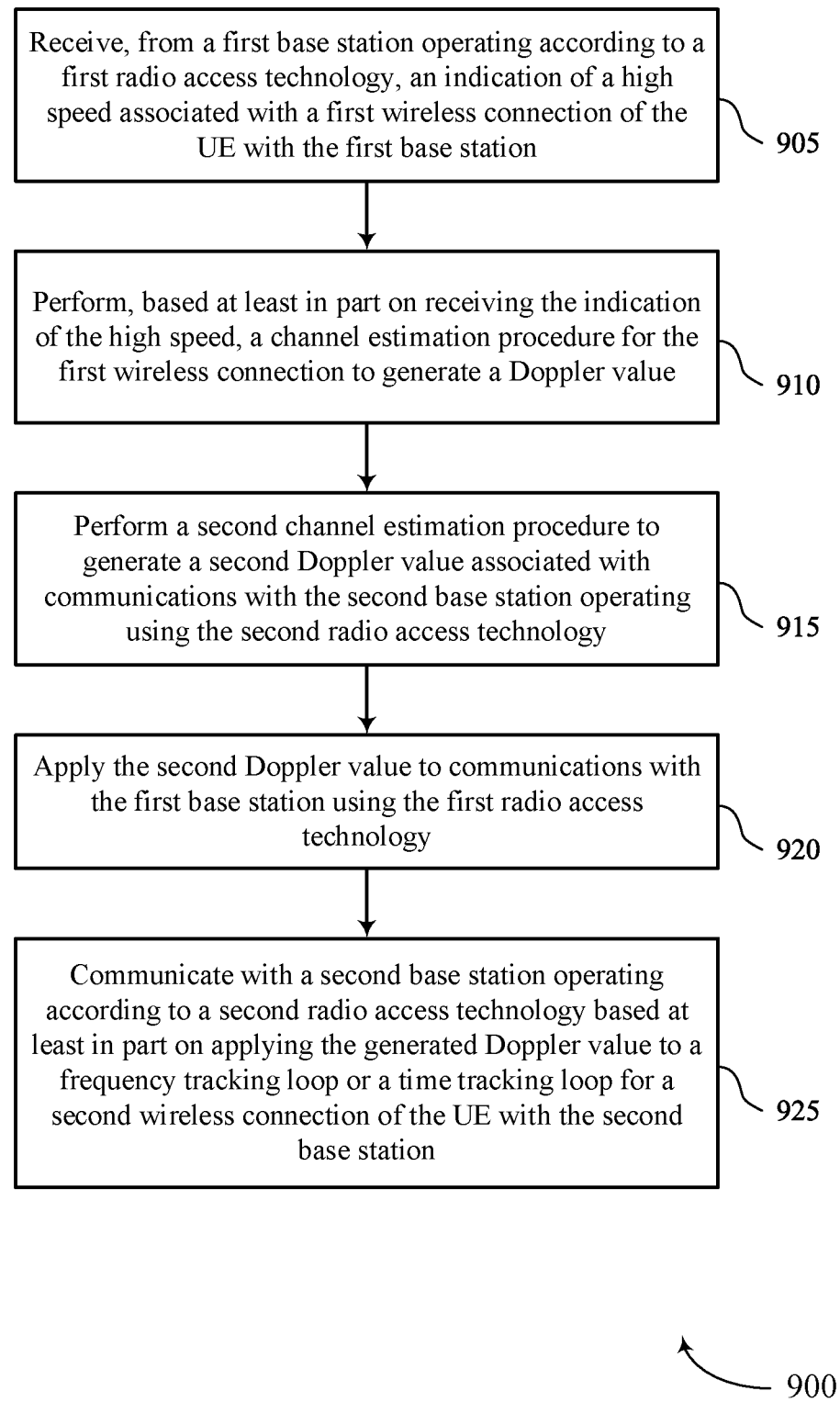

FIG. 9 shows a flowchart illustrating a method 900 that supports channel estimation for multiple radio access technologies in a high speed scenario in accordance with aspects of the present disclosure. The operations of the method 900 may be implemented by a UE or its components as described herein. For example, the operations of the method 900 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 905, the method may include receiving, from a first base station operating according to a first radio access technology, an indication of a high speed associated with a first wireless connection of the UE with the first base station. The operations of 905 may be performed in accordance with examples as disclosed herein. In some examples, aspects of the operations of 905 may be performed by a high speed indication interface 625 as described with reference to FIG. 6.

At 910, the method may include performing, based on receiving the indication of the high speed, a channel estimation procedure for the first wireless connection to generate a Doppler value. The operations of 910 may be performed in accordance with examples as disclosed herein. In some examples, aspects of the operations of 910 may be performed by a channel estimation component 630 as described with reference to FIG. 6.

At 915, the method may include performing a second channel estimation procedure to generate a second Doppler value associated with communications with the second base station operating using the second radio access technology. The operations of 915 may be performed in accordance with examples as disclosed herein. In some examples, aspects of the operations of 915 may be performed by a channel estimation component 630 as described with reference to FIG. 6.

At 920, the method may include applying the second Doppler value to communications with the first base station using the first radio access technology. The operations of 920 may be performed in accordance with examples as disclosed herein. In some examples, aspects of the operations of 920 may be performed by a RAT adjustment component 650 as described with reference to FIG. 6.

At 925, the method may include communicating with a second base station operating according to a second radio access technology based on applying the generated Doppler value to a frequency tracking loop or a time tracking loop for a second wireless connection of the UE with the second base station. The operations of 925 may be performed in accordance with examples as disclosed herein. In some examples, aspects of the operations of 925 may be performed by a communication interface 635 as described with reference to FIG. 6.

Figure 10:
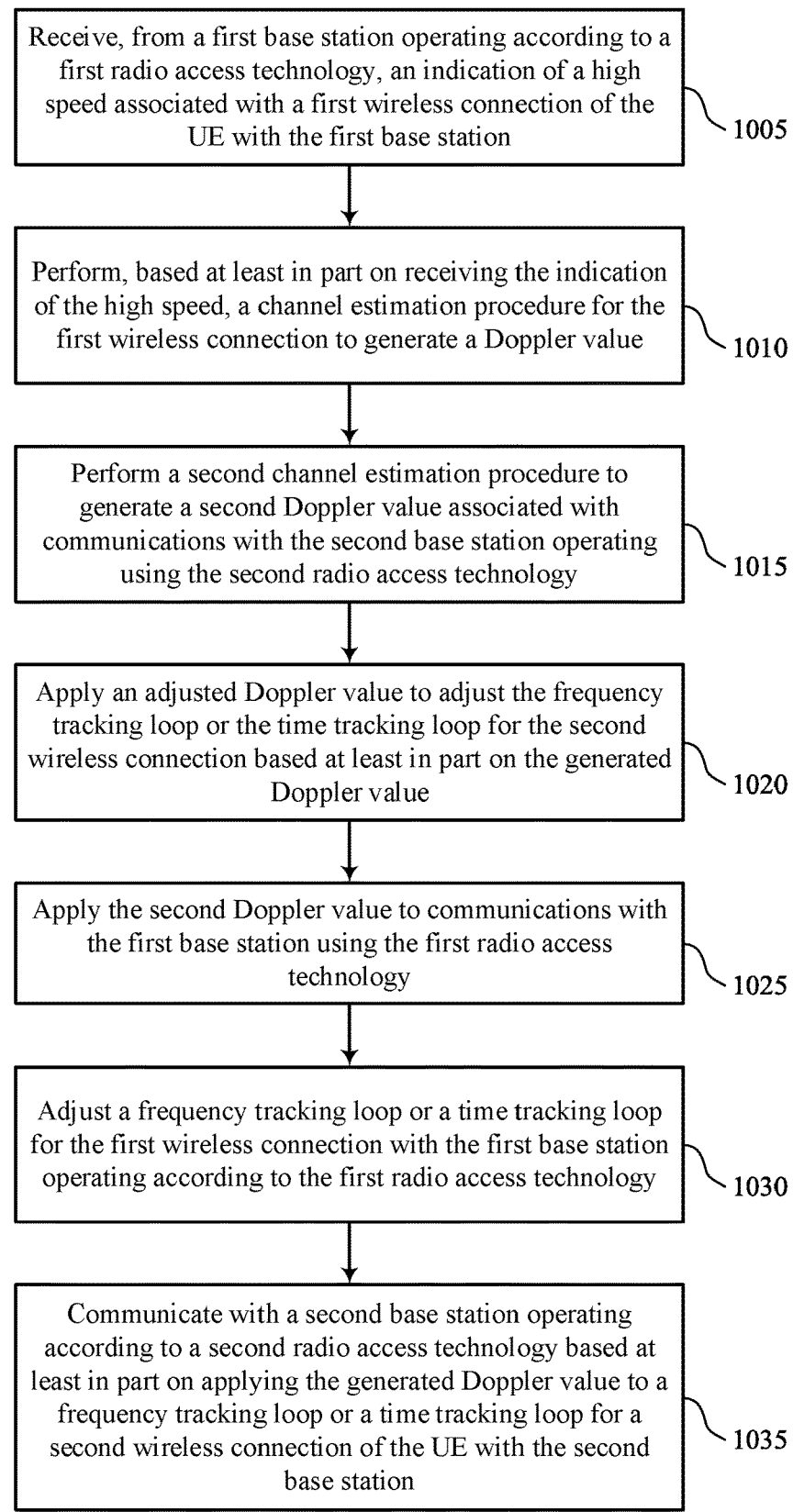

FIG. 10 shows a flowchart illustrating a method 1000 that supports channel estimation for multiple radio access technologies in a high speed scenario in accordance with aspects of the present disclosure. The operations of the method 1000 may be implemented by a UE or its components as described herein. For example, the operations of the method 1000 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1005, the method may include receiving, from a first base station operating according to a first radio access technology, an indication of a high speed associated with a first wireless connection of the UE with the first base station. The operations of 1005 may be performed in accordance with examples as disclosed herein. In some examples, aspects of the operations of 1005 may be performed by a high speed indication interface 625 as described with reference to FIG. 6.

At 1010, the method may include performing, based on receiving the indication of the high speed, a channel estimation procedure for the first wireless connection to generate a Doppler value. The operations of 1010 may be performed in accordance with examples as disclosed herein. In some examples, aspects of the operations of 1010 may be performed by a channel estimation component 630 as described with reference to FIG. 6.

At 1015, the method may include performing a second channel estimation procedure to generate a second Doppler value associated with communications with the second base station operating using the second radio access technology. The operations of 1015 may be performed in accordance with examples as disclosed herein. In some examples, aspects of the operations of 1015 may be performed by a channel estimation component 630 as described with reference to FIG. 6.

At 1020, the method may include applying an adjusted Doppler value to adjust the frequency tracking loop or the time tracking loop for the second wireless connection based on the generated Doppler value. The operations of 1020 may be performed in accordance with examples as disclosed herein. In some examples, aspects of the operations of 1020 may be performed by a RAT adjustment component 650 as described with reference to FIG. 6.

At 1025, the method may include applying the second Doppler value to communications with the first base station using the first radio access technology. The operations of 1025 may be performed in accordance with examples as disclosed herein. In some examples, aspects of the operations of 1025 may be performed by a RAT adjustment component 650 as described with reference to FIG. 6.

At 1030, the method may include adjusting a frequency tracking loop or a time tracking loop for the first wireless connection with the first base station operating according to the first radio access technology. The operations of 1030 may be performed in accordance with examples as disclosed herein. In some examples, aspects of the operations of 1030 may be performed by a RAT adjustment component 650 as described with reference to FIG. 6.

At 1035, the method may include communicating with a second base station operating according to a second radio access technology based on applying the generated Doppler value to a frequency tracking loop or a time tracking loop for a second wireless connection of the UE with the second base station. The operations of 1035 may be performed in accordance with examples as disclosed herein. In some examples, aspects of the operations of 1035 may be performed by a communication interface 635 as described with reference to FIG. 6.

Figure 11:
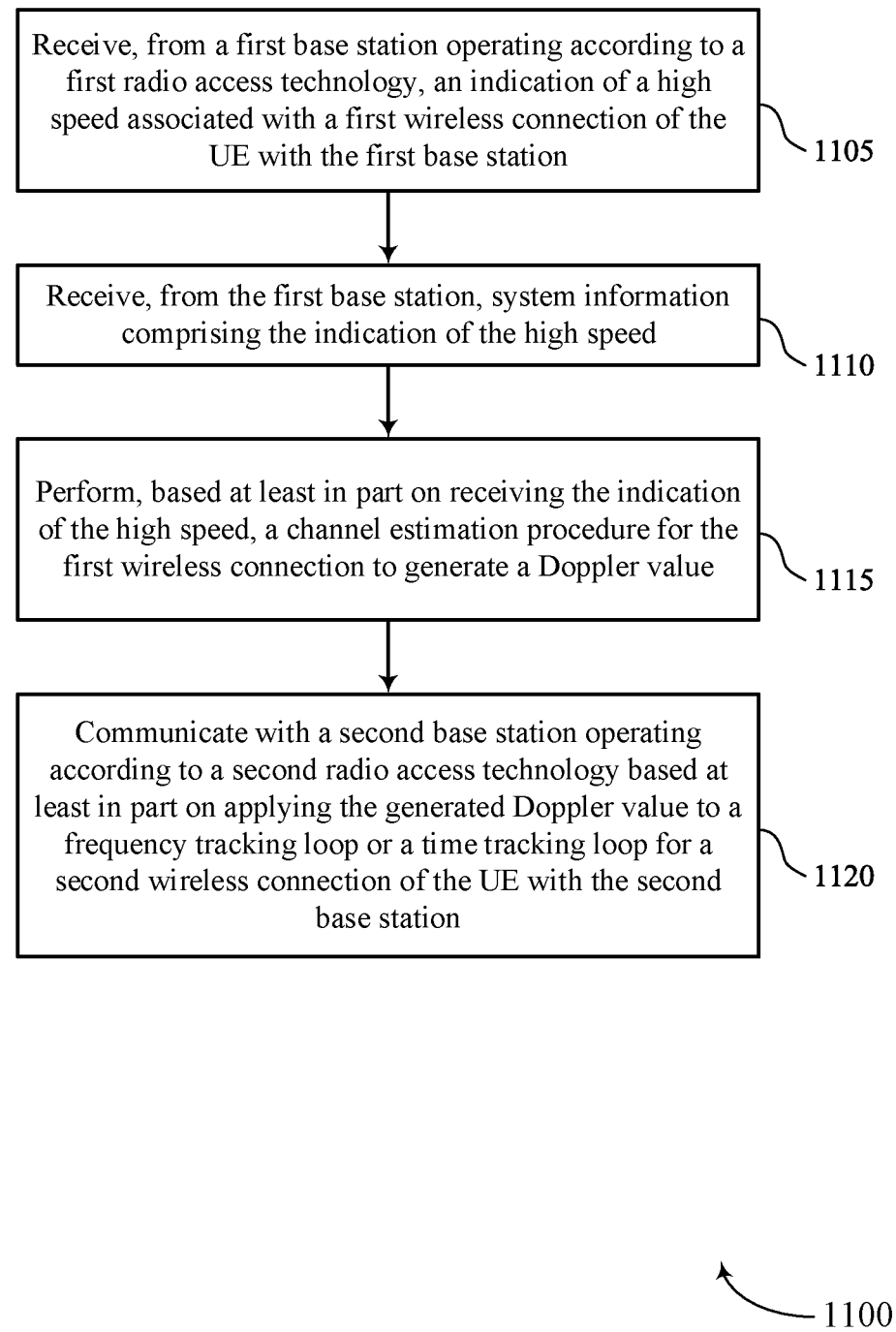

FIG. 11 shows a flowchart illustrating a method 1100 that supports channel estimation for multiple radio access technologies in a high speed scenario in accordance with aspects of the present disclosure. The operations of the method 1100 may be implemented by a UE or its components as described herein. For example, the operations of the method 1100 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1105, the method may include receiving, from a first base station operating according to a first radio access technology, an indication of a high speed associated with a first wireless connection of the UE with the first base station. The operations of 1105 may be performed in accordance with examples as disclosed herein. In some examples, aspects of the operations of 1105 may be performed by a high speed indication interface 625 as described with reference to FIG. 6.

At 1110, the method may include receiving, from the first base station, system information including the indication of the high speed. The operations of 1110 may be performed in accordance with examples as disclosed herein. In some examples, aspects of the operations of 1110 may be performed by a system information interface 665 as described with reference to FIG. 6.

At 1115, the method may include performing, based on receiving the indication of the high speed, a channel estimation procedure for the first wireless connection to generate a Doppler value. The operations of 1115 may be performed in accordance with examples as disclosed herein. In some examples, aspects of the operations of 1115 may be performed by a channel estimation component 630 as described with reference to FIG. 6.

At 1120, the method may include communicating with a second base station operating according to a second radio access technology based on applying the generated Doppler value to a frequency tracking loop or a time tracking loop for a second wireless connection of the UE with the second base station. The operations of 1120 may be performed in accordance with examples as disclosed herein. In some examples, aspects of the operations of 1120 may be performed by a communication interface 635 as described with reference to FIG. 6.

The following provides an overview of aspects of the present disclosure:

Aspect 1: A method for wireless communications at a UE, comprising: receiving, from a first base station operating according to a first radio access technology, an indication of a high speed associated with a first wireless connection of the UE with the first base station; performing, based at least in part on receiving the indication of the high speed, a channel estimation procedure for the first wireless connection to generate a Doppler value; and communicating with a second base station operating according to a second radio access technology based at least in part on applying the generated Doppler value to a frequency tracking loop or a time tracking loop for a second wireless connection of the UE with the second base station.

Aspect 2: The method of aspect 1, further comprising: receiving a command to perform a handover procedure to the second base station; generating, based at least in part on receiving the command, a random access preamble for the handover procedure with the second base station using the Doppler value generated using the channel estimation procedure with the first base station, wherein communicating with the second base station comprises; and transmitting, to the second base station, the generated random access preamble in response to the received command.

Aspect 3: The method of any of aspects 1 through 2, wherein the Doppler value comprises a first Doppler value, the method further comprising: performing a second channel estimation procedure to generate a second Doppler value associated with communications with the second base station operating using the second radio access technology; and applying the second Doppler value to communications with the first base station using the first radio access technology.

Aspect 4: The method of aspect 3, wherein applying the second Doppler value comprises: adjusting a frequency tracking loop or a time tracking loop for the first wireless connection with the first base station operating according to the first radio access technology.

Aspect 5: The method of any of aspects 3 through 4, further comprising: determining that a difference between the second Doppler value and the first Doppler value is greater than or equal to a Doppler threshold; and performing a new channel estimation procedure for the first wireless connection to generate a new Doppler value based at least in part on determining that the difference is greater than or equal to the Doppler threshold.

Aspect 6: The method of any of aspects 1 through 5, further comprising: monitoring a decoding performance metric associated with downlink communications via the first radio access technology and downlink communications via the second radio access technology; and adjusting the time tracking loop, the frequency tracking loop, or both for the first radio access technology, the second radio access technology, or both based at least in part on monitoring the decoding performance metric.

Aspect 7: The method of any of aspects 1 through 6, further comprising: determining, based at least in part on receiving the indication, a relationship between the first base station associated with the first radio access technology and the second base station associated with the second radio access technology by monitoring a first Doppler metric associated with the first radio access technology and a second Doppler metric associated with the second radio access technology during a monitoring period.

Aspect 8: The method of any of aspects 1 through 7, further comprising: applying an adjusted Doppler value to adjust the frequency tracking loop or the time tracking loop for the second wireless connection based at least in part on the generated Doppler value.

Aspect 9: The method of aspect 8, further comprising: determining the adjusted Doppler value based at least in part on a scaling factor associated with a second radio frequency spectrum band corresponding to the second radio access technology.

Aspect 10: The method of aspect 9, further comprising: applying the scaling factor when a difference between a first radio frequency spectrum band associated with the first radio access technology and the second radio frequency spectrum band is greater than or equal to a frequency threshold.

Aspect 11: The method of any of aspects 1 through 10, wherein receiving the indication comprises: receiving, from the first base station, system information comprising the indication of the high speed.

Aspect 12: The method of aspect 11, wherein the system information is a system information block type2 (SIB2) and the indication of the high speed is a high speed flag in the SIB.

Aspect 13: The method of any of aspects 1 through 12, wherein the first radio access technology operates in a first radio frequency spectrum band and the second radio access technology operates in a second radio frequency spectrum band.

Aspect 14: An apparatus for wireless communications at a UE, comprising a processor; memory coupled with the processor; and instructions stored in the memory and executable by the processor to cause the apparatus to perform a method of any of aspects 1 through 13.

Aspect 15: An apparatus for wireless communications at a UE, comprising at least one means for performing a method of any of aspects 1 through 13.

Aspect 16: A non-transitory computer-readable medium storing code for wireless communications at a UE, the code comprising instructions executable by a processor to perform a method of any of aspects 1 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving, from a first base station operating according to a first radio access technology, an indication of a high speed associated with a first wireless connection of the UE with the first base station;
   performing, based at least in part on receiving the indication of the high speed, a channel estimation procedure for the first wireless connection to generate a Doppler value; and
   communicating with a second base station operating according to a second radio access technology based at least in part on applying the generated Doppler value to a frequency tracking loop or a time tracking loop for a second wireless connection of the UE with the second base station.

2. The method of claim 1, further comprising:
   receiving a command to perform a handover procedure to the second base station;
   generating, based at least in part on receiving the command, a random access preamble for the handover procedure with the second base station using the Doppler value generated using the channel estimation procedure with the first base station, wherein communicating with the second base station comprises; and
   transmitting, to the second base station, the generated random access preamble in response to the received command.

3. The method of claim 1, wherein the Doppler value comprises a first Doppler value, the method further comprising:
   performing a second channel estimation procedure to generate a second Doppler value associated with communications with the second base station operating using the second radio access technology; and
   applying the second Doppler value to communications with the first base station using the first radio access technology.

4. The method of claim 3, wherein applying the second Doppler value comprises:
   adjusting a frequency tracking loop or a time tracking loop for the first wireless connection with the first base station operating according to the first radio access technology.

5. The method of claim 3, further comprising:
   determining that a difference between the second Doppler value and the first Doppler value is greater than or equal to a Doppler threshold; and
   performing a new channel estimation procedure for the first wireless connection to generate a new Doppler value based at least in part on determining that the difference is greater than or equal to the Doppler threshold.

6. The method of claim 1, further comprising:
   monitoring a decoding performance metric associated with downlink communications via the first radio access technology and downlink communications via the second radio access technology; and
   adjusting the time tracking loop, the frequency tracking loop, or both for the first radio access technology, the second radio access technology, or both based at least in part on monitoring the decoding performance metric.

7. The method of claim 1, further comprising:
determining, based at least in part on receiving the indication, a relationship between the first base station associated with the first radio access technology and the second base station associated with the second radio access technology by monitoring a first Doppler metric associated with the first radio access technology and a second Doppler metric associated with the second radio access technology during a monitoring period.

8. An apparatus for wireless communications at a user equipment (UE), comprising:
a processor;
memory coupled with the processor; and
instructions stored in the memory and executable by the processor to cause the apparatus to:
receive, from a first base station operating according to a first radio access technology, an indication of a high speed associated with a first wireless connection of the UE with the first base station;
perform, based at least in part on receiving the indication of the high speed, a channel estimation procedure for the first wireless connection to generate a Doppler value; and
communicate with a second base station operating according to a second radio access technology based at least in part on applying the generated Doppler value to a frequency tracking loop or a time tracking loop for a second wireless connection of the UE with the second base station.

9. The apparatus of claim 8, wherein the instructions are further executable by the processor to cause the apparatus to:
receive a command to perform a handover procedure to the second base station;
generating, base at least in part on receiving the command, a random access preamble for the handover procedure with the second base station using the Doppler value generated using the channel estimation procedure with the first base station, wherein communicating with the second base station comprises; and
transmit, to the second base station, the generated random access preamble in response to the received command.

10. The apparatus of claim 8, wherein the Doppler value comprises a first Doppler value, and the instructions are further executable by the processor to cause the apparatus to:
perform a second channel estimation procedure to generate a second Doppler value associated with communications with the second base station operating using the second radio access technology; and
apply the second Doppler value to communications with the first base station using the first radio access technology.

11. The apparatus of claim 10, wherein the instructions to apply the second Doppler value are executable by the processor to cause the apparatus to:
adjust a frequency tracking loop or a time tracking loop for the first wireless connection with the first base station operating according to the first radio access technology.

12. The apparatus of claim 10, wherein the instructions are further executable by the processor to cause the apparatus to:
determine that a difference between the second Doppler value and the first Doppler value is greater than or equal to a Doppler threshold; and
perform a new channel estimation procedure for the first wireless connection to generate a new Doppler value based at least in part on determining that the difference is greater than or equal to the Doppler threshold.

13. The apparatus of claim 8, wherein the instructions are further executable by the processor to cause the apparatus to:
monitor a decoding performance metric associated with downlink communications via the first radio access technology and downlink communications via the second radio access technology; and
adjust the time tracking loop, the frequency tracking loop, or both for the first radio access technology, the second radio access technology, or both based at least in part on monitoring the decoding performance metric.

14. The apparatus of claim 8, wherein the instructions are further executable by the processor to cause the apparatus to:
determine, based at least in part on receiving the indication, a relationship between the first base station associated with the first radio access technology and the second base station associated with the second radio access technology by monitoring a first Doppler metric associated with the first radio access technology and a second Doppler metric associated with the second radio access technology during a monitoring period.

15. The apparatus of claim 8, wherein the instructions are further executable by the processor to cause the apparatus to:
apply an adjusted Doppler value to adjust the frequency tracking loop or the time tracking loop for the second wireless connection based at least in part on the generated Doppler value.

16. The apparatus of claim 15, wherein the instructions are further executable by the processor to cause the apparatus to:
determine the adjusted Doppler value based at least in part on a scaling factor associated with a second radio frequency spectrum band corresponding to the second radio access technology.

17. The apparatus of claim 16, wherein the instructions are further executable by the processor to cause the apparatus to:
apply the scaling factor when a difference between a first radio frequency spectrum band associated with the first radio access technology and the second radio frequency spectrum band is greater than or equal to a frequency threshold.

18. The apparatus of claim 8, wherein the instructions to receive the indication are executable by the processor to cause the apparatus to:
receive, from the first base station, system information comprising the indication of the high speed.

19. The apparatus of claim 18, wherein the system information is a system information block type2 (SIB2) and the indication of the high speed is a high speed flag in the SIB2.

20. The apparatus of claim 8, wherein the first radio access technology operates in a first radio frequency spectrum band and the second radio access technology operates in a second radio frequency spectrum band.

* * * * *